(No Model.)
C. G. CURTIS.
CONTROLLING DEVICE FOR ELECTRIC MOTORS.
No. 505,594. Patented Sept. 26, 1893.
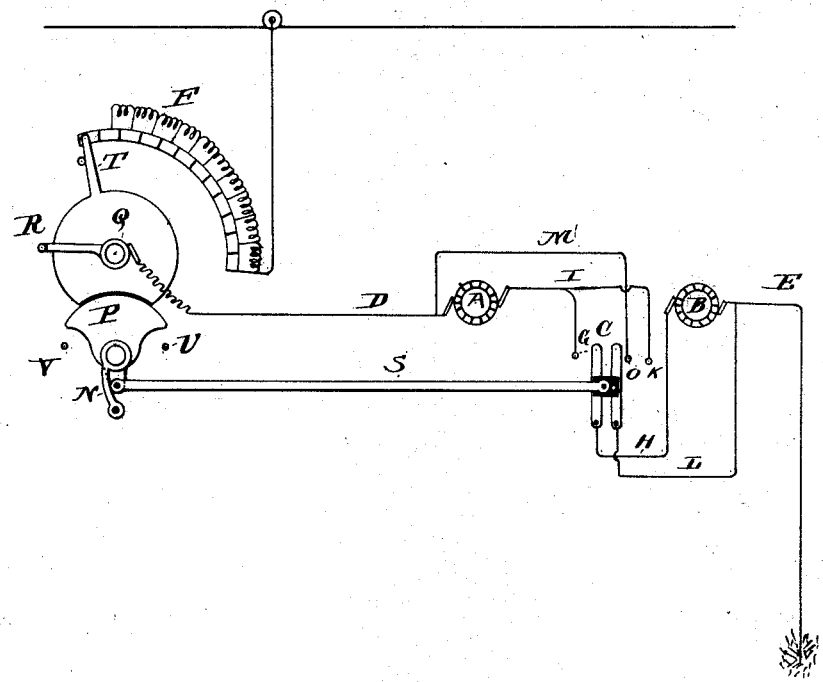
Attest:
C. W. Benjamin
C. C. Grigg.
Inventor:
Charles G. Curtis
by Read & Price
his Attorneys

UNITED STATES PATENT OFFICE.

CHARLES G. CURTIS, OF NEW YORK, N. Y.

CONTROLLING DEVICE FOR ELECTRIC MOTORS.

SPECIFICATION forming part of Letters Patent No. 505,594, dated September 26, 1893.

Application filed October 22, 1892. Serial No. 449,596. (No model.)

*To all whom it may concern:*

Be it known that I, CHARLES G. CURTIS, a citizen of the United States, residing at New York, in the county of New York and State of New York, have invented certain new and useful Improvements in Electric Car-Motors; and I do hereby declare the following to be a full, clear, and exact description of the invention, such as will enable others skilled in the art to which it appertains to make and use the same.

The object of my invention is to regulate two or more electric motors so that they may be operated for the best effects of torque and speed.

In carrying out the invention I provide a switch by which the motors may be coupled in multiple arc or series and means for locking the switch against operation except when the current is shut off by a circuit making and breaking device.

The invention is particularly applicable to electrically propelled cars or other traveling vehicles which it is desirable to operate at different speeds, and with varying degrees of torque; these results being accomplished by providing each car or train with two or more electric motors and coupling such motors in series upon starting, or when operating at low speeds, and changing to a multiple arc connection when high rates of speed are desired.

In attempting to change the connections from series to multiple arc while the motors are in operation injurious sparking results at the switch contacts and the motors become short circuited and are suddenly checked. In order to entirely avoid the difficulty I provide a system in which the current is led to the motors through a resistance or rheostat, and provide means by which the coupling lever or handle which changes the connections from series to multiple arc may be locked against action except when the circuit is open and current shut off.

The several features of novelty of my invention will be hereinafter more fully explained and will be definitely indicated in the claims appended to this specification.

In the accompanying sheet of drawings is shown diagrammatically a system embodying my improvements.

A and B represent two electric motors and C a switch by which the motors may be coupled in series or multiple arc relation with reference to the leads D, E, from a supply circuit, one of these in a traction system connecting with the ground or return wire through the car wheels, and the other connecting with a supply circuit through a rheostat F. The switch C in the diagram is shown in a position in which the motors are disconnected. When shifted to the left one of the brushes or arms of the switch will engage the contact G by which the motors will be connected in series over the path D, A, G, C, H, B, E. When shifted to the right the two motors will be coupled in multiple arc, one branch including the motor A over the path D, A, I, K, the right brush of switch and conductor L, the other branch including the motor B through the path D, M, O, left brush of switch, conductor H. The coupling switch C is controlled by a handle on the platform of the car, or other place accessible to the motor-man, and this handle is locked against movement except when the circuit is open. A simple way of accomplishing this result is that shown in the drawings. An arc shaped segment P is mounted upon the shaft of the coupling lever N and co-operates with the disk Q mounted upon a co-operating shaft upon which the circuit making handle R is fixed. In the position shown in the drawing, that is, the position of disconnection of the coupling switch the segment P rests in an arc shaped groove formed in disk Q and the handle N may be turned so as to couple the motors either in series or multiple arc. The connecting rod S secured to a crank shaft or eccentric operates the switch when the handle N is turned. The contact arm T controlled by the circuit making or breaking handle R is so set that when the parts are in the position of adjustment shown in the drawing the circuit will be open. The motors may therefore be coupled as desired without injury. When coupled the segment P will be thrown to the right or left. This will free the disk Q and permit the circuit making handle to be operated, thus gradually cutting in current through the resistance F. It will be noted that so long as the circuit remains closed the coupling handle N will be locked against a movement which would restore the coupling switch to its former position. Limiting stops U, V, should be provided by which the coupling handle may be arrested when it has been shifted sufficiently to couple the motors. When it is desired to shut off current or to change speed the circuit making handle R is shifted to the left gradually cutting in resistance and weakening the current and finally opening the circuit when the disk Q will occupy such a position as will permit the coupling handle to be turned.

In starting the motors in operation they must first be connected in multiple arc or series thus freeing the disk Q and permitting it to be turned until the full current is admitted to the motors. In the same manner any desired number of motors may be joined in multiple arc or series relation by the controlling handle.

Having thus described my invention, what I claim as new, and desire to secure by Letters Patent, is—

1. Means for regulating two or more electric motors comprising a switch for connecting them in either series or multiple arc relation, a handle controlling said switch, an independent handle operating a circuit-closing arm, and interlocking connections which prevent the operation of the switch handle except when the circuit is open.

2. Means for regulating two or more electric motors comprising a switch for connecting them in either multiple arc or series relation, a handle controlling said switch, a circuit-closing handle, a resistance adapted to be cut in or out of circuit thereby and interlocking connections between the two handles or their shafts for locking the switch against movement while the resistance is cut out.

3. The combination of a traveling vehicle or vehicles, two or more propelling electric motors mounted thereon, a switch for coupling the motors in either series or multiple arc relation, a handle for controlling the switch, and a means for locking the handle against movement until the circuit is broken.

4. The combination of a traveling vehicle or vehicles, two or more propelling electric motors mounted thereon, a switch for connecting the motors in series or multiple arc relation, a handle for operating said switch, a rheostat and controlling lever for regulating the current, and means for locking the switch against movement except when the rheostat lever has been operated and the circuit opened.

In testimony whereof I affix my signature in presence of two witnesses.

CHARLES G. CURTIS.

Witnesses:
VICTOR E. BURKE,
E. C. GRIGG.